United States Patent
Genda

(10) Patent No.: US 11,949,820 B2
(45) Date of Patent: Apr. 2, 2024

(54) INFORMATION PROCESSING AND IMAGE ANALYSIS TECHNIQUE TO INSPECT READ IMAGE DATA OF A FORMED IMAGE AND DETECT A CYCLE OF IMAGE DEFECTS OR UNEVENNESS

(71) Applicant: KONICA MINOLTA, INC., Tokyo (JP)

(72) Inventor: Daisuke Genda, Kawasaki (JP)

(73) Assignee: Konica Minolta, Inc., Tokyo (JP)

( * ) Notice: Subject to any disclaimer, the term of this patent is extended or adjusted under 35 U.S.C. 154(b) by 84 days.

(21) Appl. No.: 17/866,553

(22) Filed: Jul. 18, 2022

(65) Prior Publication Data
US 2023/0033553 A1    Feb. 2, 2023

(30) Foreign Application Priority Data

Jul. 30, 2021 (JP) .................. 2021-125027

(51) Int. Cl.
*H04N 1/00* (2006.01)

(52) U.S. Cl.
CPC ..... *H04N 1/00055* (2013.01); *H04N 1/00015* (2013.01); *H04N 1/00037* (2013.01); *H04N 1/00039* (2013.01); *H04N 1/00074* (2013.01); *H04N 1/0009* (2013.01)

(58) Field of Classification Search
CPC ... H04N 1/00002–0009; G06K 15/027; G06K 15/1219; G06T 2207/30144
See application file for complete search history.

(56) References Cited

U.S. PATENT DOCUMENTS

| 5,365,310 | A  | * | 11/1994 | Jenkins   | H04N 1/32     |
|           |    |   |         |           | 399/8         |
| 7,783,122 | B2 | * | 8/2010  | Wu        | H04N 1/00015  |
|           |    |   |         |           | 382/254       |
| 8,797,600 | B2 | * | 8/2014  | Harashima | H04N 1/60     |
|           |    |   |         |           | 382/175       |
| 9,185,240 | B2 | * | 11/2015 | Kojima    | H04N 1/00013  |
| 10,635,039| B2 | * | 4/2020  | Ikeda     | G03G 15/556   |

FOREIGN PATENT DOCUMENTS

JP        2009-020215 A    1/2009

* cited by examiner

*Primary Examiner* — Scott A Rogers
(74) *Attorney, Agent, or Firm* — Osha Bergman Watanabe & Burton LLP

(57) ABSTRACT

An information processing apparatus is communicably connected to one or more image forming apparatuses each including: an image forming device that forms an image on a recording medium; an image reading device that reads the image to obtain read image data; and an image forming controller that executes a first inspection and detects in the read image data an image defect corresponding to a predetermined inspection item at a first cycle, the information processing apparatus including: a processing controller that: acquires inspection source data based on the read image data obtained from at least one of the image forming apparatuses, and executes a second inspection to inspect the inspection source data.

26 Claims, 11 Drawing Sheets

FIG.5

| Apparatus information | Model |
|---|---|
| Information 1 | Hardware version (Lot) |
| Information 2 | Software version |
| Information 3 | Setting conditions |
| Information 4 | Mounted component |
| Information 5 | Use history |
| ...... | ...... |

FIG.6

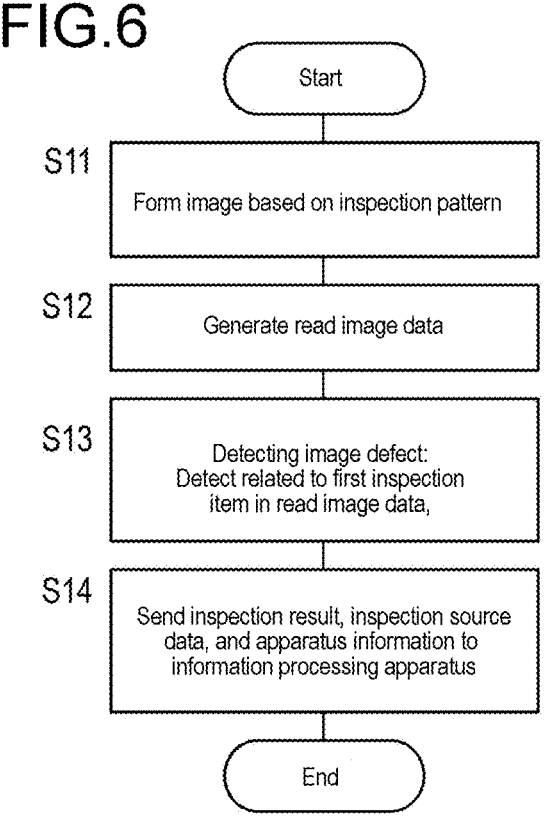

FIG.7

| Inspection item | Period (mm) | Threshold value | Member (Cause of occurrence) |
|---|---|---|---|
| Image unevenness | 300 | ** | Photosensitive drum |
| Image unevenness | 43 | ** | Develop roller |
| Vertical streak | — | ** | Each component |
| White spot | — | ** | None |
| ...... | ...... | ...... | ...... |

FIG.8
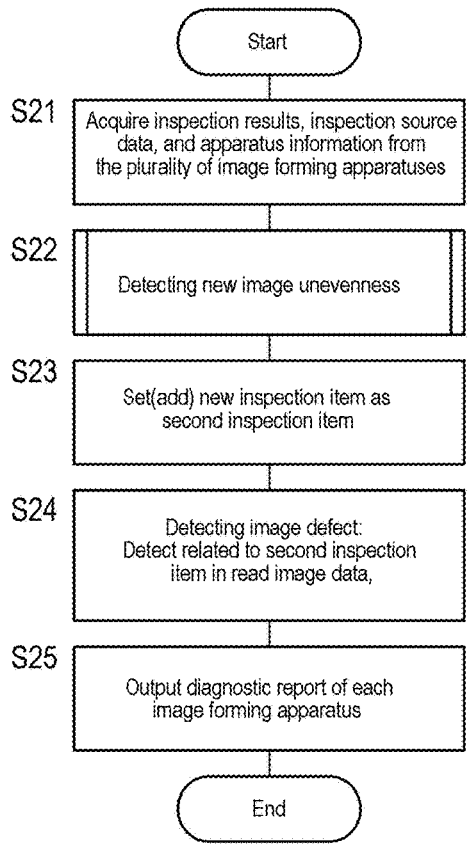
FIG.9
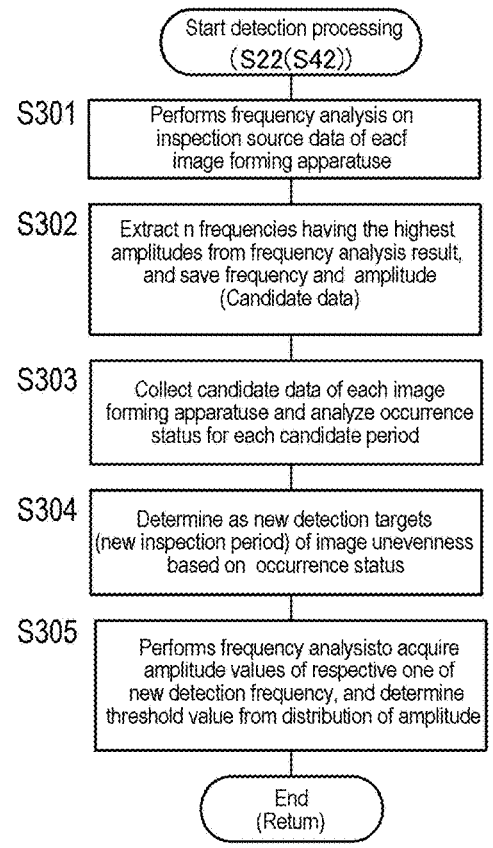
FIG.10
| Inspection item | Period (mm) | Threshold value | Member (Cause of occurrence) |
|---|---|---|---|
| Image unevenness | 1.5 | ** | **** |
| Image unevenness | 6 | ** | *** |
| Image unevenness | 18 | ** | Photosensitive drum drive unit |
| ...... | ...... | ...... | ...... |

FIG.14A

IMAGE DIAGNOSIS RESULT

| Data | 2020/6/6 17:40:50 |
|---|---|
| Machine ID | AXXBB01291000 |

| | | Detailed diagnosis | Reason for presumption |
|---|---|---|---|
| Vertical streak | Y | OK | |
| | M | OK | |
| | C | OK | |
| | K | OK | |
| Horizontal streak | Y | NG | Development unit |
| | M | NG | Photosensitive drum unit |
| | C | NG | Photosensitive drum unit |
| | K | NG | Photosensitive drum unit |
| Spot | Y | | |
| | M | | |
| | C | | |
| | K | | |
| Periodic image unevenness | Y | NG | 1.5mm |
| | M | OK | |
| | C | NG | 6.0mm, 18.0mm |
| | K | NG | | a11 (rows for Vertical streak through Spot)
a12 (rows for Periodic image unevenness)
p01

INFORMATION PROCESSING AND IMAGE ANALYSIS TECHNIQUE TO INSPECT READ IMAGE DATA OF A FORMED IMAGE AND DETECT A CYCLE OF IMAGE DEFECTS OR UNEVENNESS

CROSS-REFERENCE TO RELATED APPLICATION

The entire disclosure of Japanese patent application No. 2021-125027, filed on Jul. 30, 2021, is incorporated herein by reference.

BACKGROUND

1. Technical Field

The present invention relates to an information processing apparatus, an information processing system, an image analysis method, and a computer-readable recording medium storing instructions.

2. Description of Related Arts

There is an inspection technique in which an image formed on a recording material such as a sheet by an image forming apparatus is read by a reading device provided in the image forming apparatus or a post-processing apparatus, and the quality of the image is determined.

Japanese Unexamined Patent Publication No. 2009-020215 discloses a technique used in an image forming apparatus and for identifying a cause of occurrence of a periodic image by an inspection sensor in the apparatus. In this image forming apparatus, images posted on a plurality of sequential recording materials are detected by an inspection sensor, information on a periodic image is extracted from a difference from corresponding image data, and the detected occurrence interval is compared with stored rotation periods of apparatuses in the configuration, thereby identifying the cause of occurrence.

However, although the technique of Japanese Unexamined Patent Publication No. 2009-020215 can identify a position that has caused the occurrence of image unevenness (periodic image) of a period that matches the rotation period stored in the storage unit, image unevenness does not necessarily occur in the rotation period of one component. For example, image unevenness occurs due to various constituent elements such as interference of a plurality of components and mismatching of a control parameter related to a rotation speed. According to the technique of Japanese Unexamined Patent Publication No. 2009-020215, it is difficult to identify the cause of such occurrence in advance and cope with the occurrence.

Further, since increase of the periods of the target to be inspected increases the load of the arithmetic processing, it is difficult to take measures only by just increasing the number of target periods. Further, since the intensity and visibility of the image unevenness that occurs are not uniform, it may be difficult to identify the period of the image unevenness from the output result of one image forming apparatus.

SUMMARY

One or more embodiments of the present invention provide an information processing apparatus and an image processing method capable of reducing a load of arithmetic processing performed by an image forming apparatus and detecting an image defect with high accuracy.

Furthermore, one or more embodiments of the present invention provide an information processing apparatus and an image processing method that can identify a period (cycle or frequency) of image unevenness that is difficult to detect by the image forming apparatus itself.

One or more embodiments of the present invention have the following configurations. An information processing apparatus, which reflects one aspect of the present invention, communicably connected to one or more image forming apparatuses each including an image forming unit (i.e., an image forming device), an image reading unit (i.e., an image reading device), and a first image analysis unit (i.e., an image forming controller) that detects an image defect related to a predetermined inspection item in read image data, includes an acquisition unit (i.e., a processing controller) that acquires, from the image forming apparatus, inspection source data based on the read image data obtained by the image reading unit reading an image of a recording medium formed by the image forming unit; and a second image analysis unit (i.e., the processing controller) that inspects the inspection source data for inspection content different from inspection performed by the first image analysis unit.

An information processing apparatus, which reflects one aspect of the present invention, communicably connected to a plurality of image forming apparatuses each including an image forming unit (i.e., an image forming device) and an image reading unit (i.e., an image reading device), includes an acquisition unit (i.e., a processing controller) that acquires, from the image forming apparatus, inspection source data based on read image data obtained by the image reading unit reading an image of a recording medium formed by the image forming unit; and a second image analysis unit (i.e., the processing controller) that performs detection processing on the inspection source data to detect periodic image unevenness that has a new period (cycle or frequency) other than a period (cycle or frequency) inspected for a predetermined inspection item including an inspection item related to image unevenness having one or more specific periods and that commonly occurs in a plurality of pieces of the inspection source data acquired from the plurality of image forming apparatuses.

An image analysis method, which reflects one aspect of the present invention, performed by an information processing apparatus communicably connected to one or more image forming apparatuses each including an image forming unit, an image reading unit, and a first image analysis unit that detects an image defect related to a predetermined inspection item in read image data, includes acquiring, from the image forming apparatus, inspection source data based on the read image data obtained by the image reading unit reading an image of a recording medium formed by the image forming unit; and inspecting the inspection source data for inspection content different from inspection performed by the first image analysis unit.

An image analysis method, which reflects one aspect of the present invention, performed by an information processing apparatus communicably connected to a plurality of image forming apparatuses each including an image forming unit and an image reading unit, includes acquiring, from the image forming apparatus, inspection source data based on read image data obtained by the image reading unit reading an image of a recording medium formed by the image forming unit; and performing, detection processing on the inspection source data to detect periodic image unevenness that has a new period (cycle or frequency) other than a period (cycle or frequency) inspected for a predetermined inspection item including an inspection item related to image unevenness having one or more specific periods and that commonly occurs in a plurality of pieces of the inspection source data acquired from the plurality of image forming apparatuses.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a table indicating an example of apparatus information.

FIG. 6 is a flow chart illustrating the inspection processing performed by the image forming apparatus.

FIG. 7 is a table indicating an example of first inspection items.

FIG. 8 is a flowchart illustrating inspection processing performed by the information processing apparatus.

FIG. 9 is a subroutine flowchart illustrating detection processing of step S22.

FIG. 10 is a table indicating an example of second inspection items.

FIG. 14A is an example of a diagnostic report.

DETAILED DESCRIPTION OF EMBODIMENTS

Figure 1:
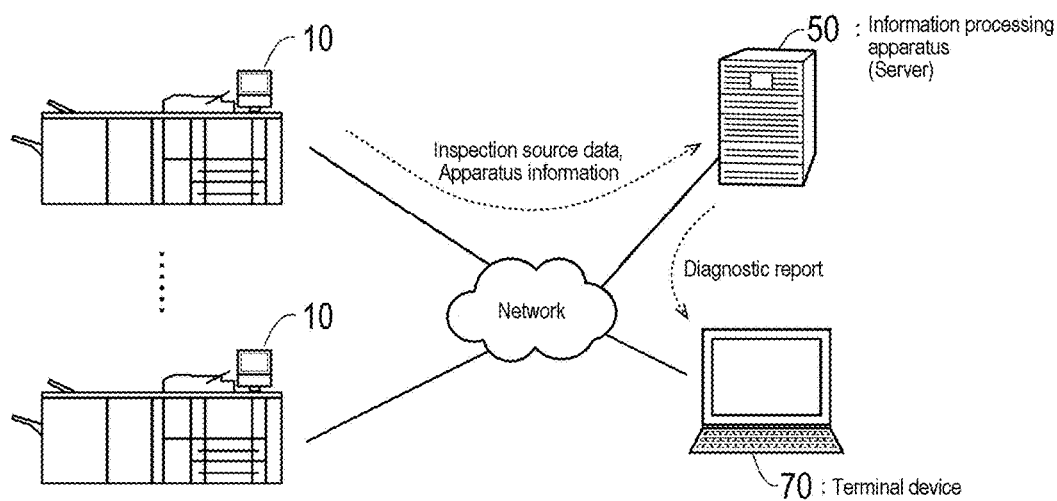
FIG. 1 is a schematic diagram illustrating an information processing system including an information processing apparatus according to a first embodiment and an image forming apparatus connected to the information processing apparatus.

Embodiments of the present invention will be described hereinafter with reference to the attached drawings. However, the scope of the invention is not limited to the disclosed embodiments. In the description of the drawings, the same elements are denoted by the same reference signs, and the same description is not repeated. Dimension ratios in the drawings may be exaggerated for convenience of description and those may be different from actual ratios in some cases.

First Embodiment

FIG. 1 is a schematic diagram illustrating an information processing system 500 according to the first embodiment. The information processing system 500 includes an information processing apparatus 50 and one or a plurality of image forming apparatuses 10. In the example illustrated in FIG. 1, in the information processing system 500, the information processing apparatus 50 includes a plurality of the image forming apparatuses 10. A terminal device 70 is a PC, a tablet terminal, a smartphone, or the like, and is used by a user such as a service staff who maintains and manages each of the image forming apparatuses 10. These devices are communicably connected to each other via a network. The information processing apparatus 50 functions as a server such as a web server and a database server. The information processing apparatus 50 generates a diagnostic report indicating a state of each image forming apparatus 10 by collecting inspection source data, apparatus information, a primary inspection result, and the like periodically (for example, every day) transmitted from each image forming apparatus 10 and performing additional inspection and analysis described below. The service staff refers to the generated diagnostic report via the terminal device 70 and uses the diagnostic report for maintenance and management of the image forming apparatus 10.

Image Forming Apparatus 10

Figure 2:
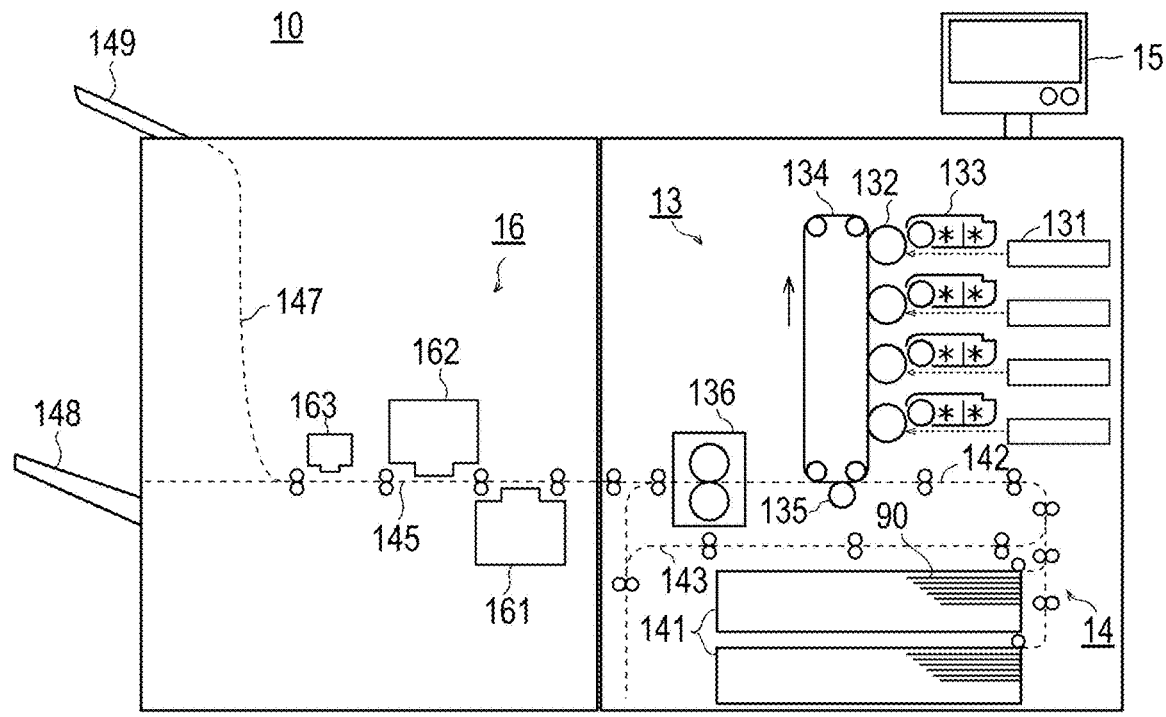
FIG. 2 is a cross-sectional view illustrating a schematic configuration of an image forming apparatus.
Figure 3:
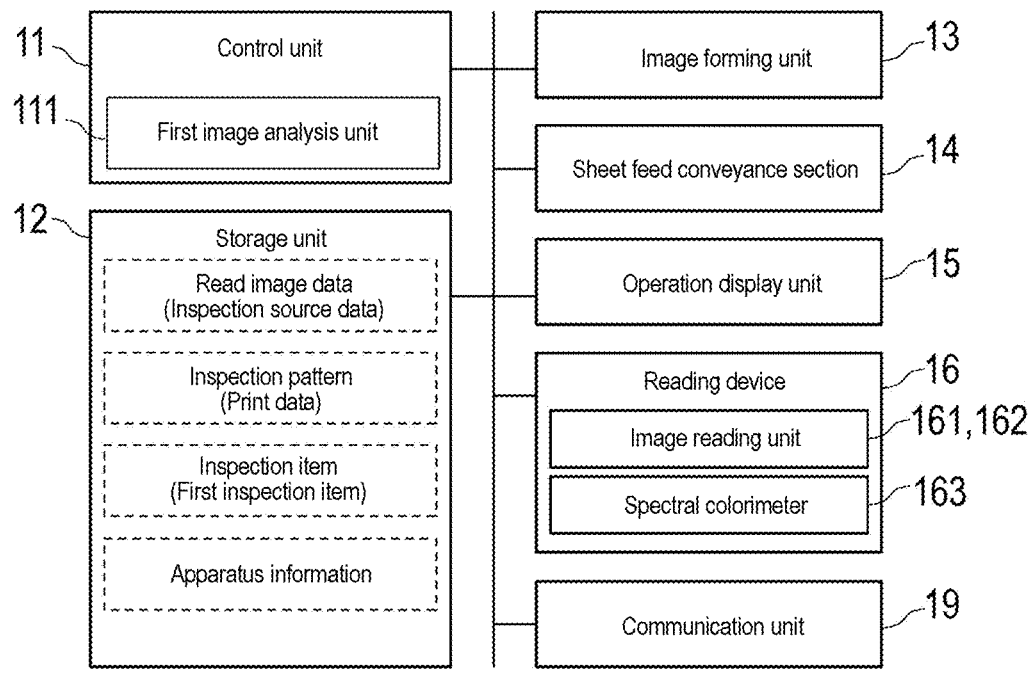
FIG. 3 is a block diagram illustrating a hardware configuration of the image forming apparatus.

FIG. 2 is a cross-sectional view illustrating a schematic configuration of the image forming apparatus 10. FIG. 3 is a block diagram illustrating a hardware configuration of the image forming apparatus 10.

As illustrated in these drawings, the image forming apparatus 10 includes a control unit (or image forming controller) 11, a storage unit (or storage) 12, an image forming unit (or image forming device) 13, a sheet feed conveyance section (or sheet conveyor) 14, an operation display unit (or display device) 15, a reading device (or image reading device) 16, and a communication unit (or communication interface) 19, which are mutually connected via a bus or the like for exchanging signals.

Control Unit 11 and Storage Unit 12

The control unit 11 is a CPU, and controls each unit of the apparatus and performs various types of arithmetic processing according to instructions. The control unit 11 functions as a first image analysis unit 111. The first image analysis unit 111 inspects the read image data generated by the reading device 16. The inspection includes periodic inspection (regular inspection) for determining the state of the image forming apparatus 10 and product inspection for inspecting whether a product (printed matter on which an image is formed) is normally output. The regular inspection will be described below. In the product inspection, read image data obtained by reading printed matter and print data (document data) are compared with each other, and thus whether the printed matter is normal is inspected.

The storage unit 12 includes a ROM that stores various instructions/programs and various types of data in advance, a RAM that temporarily stores instructions/programs and data as a work area, a hard disk that stores various instructions/programs and various types of data, and the like. The storage unit 12 stores print data (hereinafter, referred to as an "inspection pattern") such as read image data, a halftone image used in regular inspection, a color chart in which color patches of a plurality of colors are arranged, an inspection chart in which a plurality of grid images and registration mark images for misregistration detection are arranged, inspection items (first inspection items (group)), and apparatus information on the apparatus (see FIG. 5 described below).

Image Forming Unit 13

The image forming unit 13 forms an image by, for example, an electrophotographic method, and includes writing units 131 and image forming sections corresponding to basic colors (yellow (Y), magenta (M), cyan (C), and black (K)). Each of the image forming sections includes a photosensitive drum 132, a charge electrode (not illustrated), a development unit 133 that contains two component developer composed of toner and carrier, and a cleaning section (not illustrated). The toner images formed by the image forming sections of the respective colors are superimposed on each other on an intermediate transfer belt 134, and are transferred, in a secondary transfer section 135, to a sheet 90 (also referred to as a recording medium) conveyed. The (full-color) toner image on the sheet 90 is heated and pressed in a fixing section 136 on the downstream side so as to be fixed on the sheet 90.

Sheet Feed Conveyance Section 14

The sheet feed conveyance section 14 includes a plurality of sheet feed trays 141, conveyance paths 142, 143, 145, and 147, a plurality of conveyance rollers disposed along the conveyance paths 142, 143, 145, and 147, and a drive motor (not illustrated) that drives the conveyance rollers. The sheet 90 fed from the sheet feed tray 141 is conveyed along the conveyance path 142, subjected to image formation by the image forming unit 13, then conveyed to the downstream side, read by the reading device 16 according to settings, and then discharged to the sheet discharge tray 148 or the sheet discharge tray 149.

When the print setting of the print job is duplex printing, the sheet 90 on which the image is formed on one side (first side) is conveyed to the ADU conveyance path 143 in a lower portion of the image forming apparatus 10. The sheet 90 conveyed to the ADU conveyance path 143 is turned upside down by a switchback path, then merges with the conveyance path 142, and an image is formed on the other side (second side) of the sheet 90 by the image forming unit 13 again.

Operation Display Unit 15

The operation display unit 15 includes a touch panel, a numeric keypad, a start button, a stop button, and the like, displays a state of the image forming apparatus 10, and is used for inputting various settings and instructions by a user. In a case where an abnormality is detected in the proof inspection by the control unit 11 or the inspection by the first image analysis unit 111 of the control unit 11, the inspection result may be displayed.

Reading Device 16

The reading device 16 includes image reading units 161 and 162 and a spectral colorimeter 163. These are arranged so that the conveyance path 145 serves as a reading region. The image reading units 161 and 162 are scanners, and both have the same configuration. The image reading units 161 and 162 are disposed so as to read images on different surfaces of the sheet 90. In a case where the duplex printing is set, the image reading unit 161 reads the lower surface (first surface) of the sheet 90, and the image reading unit 162 reads the upper surface (second surface) of the sheet 90. In a case where the single-sided printing is set, the image on the front surface side of the sheet 90 is read only by the image reading unit 162.

The control unit 11 performs color adjustment and image position adjustment by analyzing read image data obtained by reading an inspection pattern in which patches in a plurality of colors and thin lines are arranged in regular inspection (e.g. at the start of the apparatus every morning). At the same time, an image defect is detected by performing image analysis on the halftone inspection pattern having uniform density over the entire surface.

The image reading unit 161 (or 162) includes a sensor array, a lens optical system, a light emitting diode (LED) light source, and a housing for storing these components.

The sensor array is a color line sensor including a plurality of optical elements (e.g. charge coupled devices (CCD)) linearly arranged along the main scanning direction, and a reading area in the width direction corresponds to the full width of the sheet 90. The optical system includes a plurality of mirrors and lenses. Light from the LED light source is transmitted through the document glass and the front surface of the sheet 90 passing through the reading position of the conveyance path 145 is irradiated with the light. The image at the reading position is guided by the optical system and is formed on a sensor array.

Spectral Colorimeter 163

The spectral colorimeter 163 can spectrally measure, on the conveyance path 145, the color of each color patch of the color evaluation image formed on the sheet 90 by the image forming unit 13, and acquire the spectral reflectance of each wavelength in the visible light region and the vicinity thereof. The colorimetric data can be output in a color system such as XYZ. Each color patch of the evaluation image is similarly read by the image reading unit 161 or the image reading unit 162 as described below, and is converted into data of the same color system such as XYZ. Then, by comparing both pieces of data, calibration (determination of a correction value) of the image reading units 161 and 162 is performed.

Communication Unit 19

The communication unit 19 is an interface for enabling the image forming apparatus 10 to communicate with an external device such as the information processing apparatus 50. As the communication unit 19, various local connection interface such as a network interface based on a standard such as Universal Serial Bus (USB), Ethernet (registered trademark), or IEEE1394, and a wireless communication interface such as Bluetooth (registered trademark) or IEEE802.11 is used.

Information Processing Apparatus 50

Figure 4:
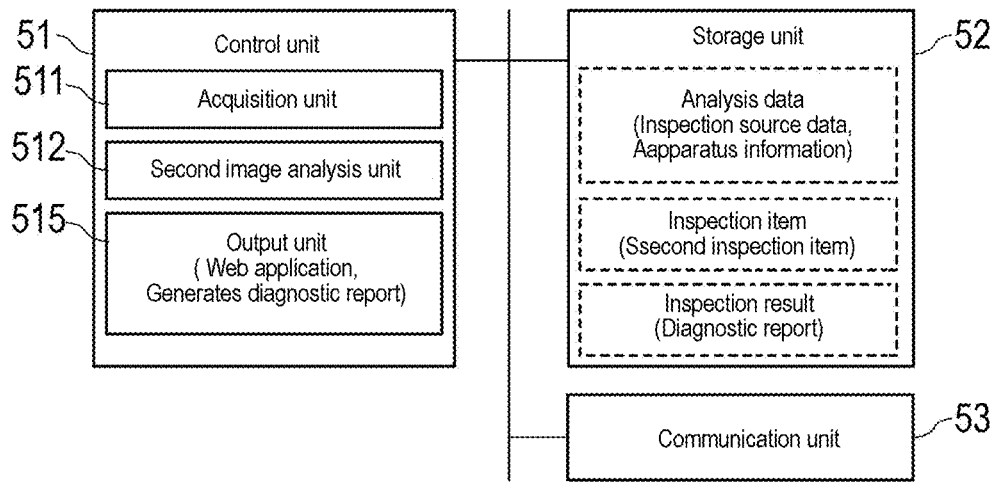
FIG. 4 is a block diagram illustrating a hardware configuration of the information processing apparatus.

FIG. 4 is a block diagram illustrating a hardware configuration of the information processing apparatus 50. The information processing apparatus 50 includes a control unit (or processing controller) 51, a storage unit (or storage) 52, and a communication unit (or communication interface) 53. These components are similar to the control unit 11, the storage unit 12, and the communication unit 19 described above.

Control Unit 51

The control unit 51 functions as the acquisition unit 511 and the output unit 515 in cooperation with the communication unit 53. Further, the control unit 51 functions as the second image analysis unit 512. The acquisition unit 511 acquires inspection source data, apparatus information, and the like from the image forming apparatus 10. The second image analysis unit 512 performs inspection of inspection content different from that of the first image analysis unit 111. The output unit 515 generates a diagnostic report in which the inspection results of the first image analysis unit 111 and the second image analysis unit 512 are integrated, or which includes a composite image in which a marking indicating a defective portion is added to an image generated as inspection source data. In addition, the output unit 515 has a web application function, and provides the diagnostic report to the service staff or causes the service staff to view the diagnostic report through the browser. Details of these functions will be given below.

Storage Unit 52

The storage unit 52 stores analysis data, inspection items (second inspection items (group)), and inspection results. The inspection items and the inspection results will be described below.

The analysis data is data acquired by the acquisition unit 511 from the plurality of image forming apparatuses 10. The analysis data includes inspection source data and apparatus information.

The "inspection source data" is the read image data itself obtained by reading the sheet 90 to be inspected, or processed data obtained by processing the read image data to such an extent that spatial information of the image necessary for inspection is not lost. For example, in a case where image unevenness in a sheet width direction (also referred to as a main scanning direction, hereinafter, simply referred to as a CD) that periodically occurs is an inspection target, the processed data is one dimensional (vertical) processed data (hereinafter, also referred to as profile data) obtained by averaging pixel values in the width direction. By using profile data, the data size can be reduced, the transmission time for transmission of data to the information processing apparatus 50 can be shortened, and the data capacity when the data is stored in the information processing apparatus 50 can be reduced.

FIG. 5 is a table indicating an example of apparatus information. The "apparatus information" includes a model, a hardware version, a software version, setting conditions, mounted components, and a use history of the image forming apparatus. The model is also referred to as a model number or a product name. The hardware version is also referred to as a lot, and may be one of, for example, a version of an initial lot when the product is marketed and second and subsequent versions with minor changes. The software version is a version of control software written in firmware (FW). This control software is updated as appropriate by the service staff. The "setting conditions" include adjustment values related to image formation and sheet conveyance of the image forming apparatus 10. For example, the speed adjustment values of the intermediate transfer belt 134 and the secondary transfer section 135, the sheet feed timing in the sheet feed conveyance section 14, the sheet conveyance speed, the tip timing, and the like are adjustment values. The mounted component is the presence or absence of an optional device/component such as a post-processing apparatus, and its model number. The use history includes the number of sheets and a use time while the main body of the image forming apparatus 10 and each replacement component (each component of the photosensitive drum 132, the development unit 133, the cleaning section, and the fixing section 136) are used. The use history of the replacement component is reset when a service staff replaces the replacement component with a new component in a predetermined maintenance cycle.

Inspection Processing

Next, inspection processing that is performed by the information processing system 500 will be described. The inspection processing described below is regular inspection, and is performed, for example, every day when the power supply of the image forming apparatus 10 is turned on, and some inspection results are transmitted to the information processing apparatus 50 and collected. The regular inspection includes color adjustment (color inspection), image position adjustment (image position inspection), and image defect inspection, but hereinafter, only the image defect inspection will be described, and a description of the other inspection will be omitted.

(Inspection of Image Forming Apparatus 10)

FIG. 6 is a flow chart illustrating the inspection processing performed by the image forming apparatus 10. FIG. 7 is a table indicating an example of first inspection items used in the image forming apparatus 10.

Step S11

The control unit 11 causes the image forming unit 13 to form an image based on an inspection pattern stored in the storage unit 12, for example, image data of full-surface halftone. For example, a plurality of single-color, full-surface uniform halftones of each Y, M, C, and K are sequentially formed.

Step S12

The image reading unit 162 reads an image formed on the sheet 90 by the image forming unit 13 and generates read image data.

Step S13

The first image analysis unit 111 performs inspection for the first inspection items on the read image data obtained in step S12.

Inspection for First Inspection Items (Primary Inspection)

The first inspection items are predetermined inspection items and are inspection items that are commonly inspected in each image forming apparatus 10. As illustrated in FIG. 7, the first inspection items include image unevenness (period: 300 mm), image unevenness (period: 43 mm), vertical streaks in the sheet feeding direction (FD), and white spots in the form of spots. The first image analysis unit 111 performs inspection related to each inspection item by image processing.

In the inspection of the periodic image unevenness in the CD, for example, after averaging processing is performed on pixels arranged in the width direction (corresponding to the above-described profile data), a signal intensity (amplitude)

of each frequency (spatial frequency) is obtained by frequency analysis such as fast Fourier transform (FFT), and in a case where the signal intensity is equal to or greater than a predetermined threshold value, it is determined that an image defect is present.

In the inspection of the vertical streak, for example, by using a differential filter or the like, a difference value is calculated by obtaining a difference between a pixel of interest and a pixel separated from the pixel of interest in the width direction by a predetermined distance (the number of pixels), and it is determined based on a distribution of pixels for which the difference values are equal to or greater than a predetermined threshold value, or it is determined that there is a vertical streak defect in a case where there is a change equal to or greater than a predetermined threshold value from an average value of adjacent pixels obtained by averaging the difference values in a vertical direction.

In the inspection of a dot-like defect such as a white spot, a black-and-white spot, or a stain, for example, a difference between pixels at corresponding positions of read image data and an inspection pattern (original image data) is obtained, pixels having differences equal to or greater than a predetermined value are extracted, the extracted pixels are clustered with adjacent pixels (clustering), and it is determined that there is a dot-like defect such as a white spot in a case where an area and/or an integral value (the number of pixels×pixel value difference) of the cluster is equal to or greater than a predetermined threshold value.

If the number of first inspection items performed on the image forming apparatus 10 side is too large, it takes time to perform the processing. Since the regular inspection on the side of the image forming apparatus 10 includes inspection other than the image defect inspection as described above (color adjustment, image position adjustment, and the like), the resources cannot be dedicated to the processing of the image defect inspection. Under such circumstances, there is an upper limit to the number of first inspection items, and there are also limitations on the content thereof. Therefore, a part of the inspection items are set as second inspection items (FIG. 10 to be described below), and is shared and performed on the information processing apparatus 50 side.

Step S14

The control unit 11 cooperates with the communication unit 19 to transmit the inspection result obtained in step S13, the inspection source data based on the read image data used in step S13, and the apparatus information. As described above, the inspection source data is the read image data itself or profile data obtained by processing the read image data.

Inspection Processing of Information Processing Apparatus 50

Next, the inspection performed by the information processing apparatus 50 will be described. FIG. 8 is a flowchart illustrating inspection processing performed by the information processing apparatus 50. FIG. 9 is a subroutine flowchart illustrating the processing in step S22 of FIG. 8, and FIG. 10 is a table indicating an example of second inspection items.

As described below, the information processing apparatus 50 collects inspection results transmitted from the image forming apparatuses 10 by regular inspection, inspects the second inspection items as inspection contents different from the inspection performed by the first image analysis unit 111 of the image forming apparatus 10 based on inspection source data, or performs detection processing for detecting image unevenness of an unknown period (cycle or frequency) and sets (adds) the inspection contents to the second inspection items.

Step S21

In accordance with the processing in step S14 described above, the acquisition unit 511 acquires inspection results, inspection source data, and apparatus information from the plurality of image forming apparatuses 10. The acquisition of the apparatus information may be omitted, or may be acquired from a database (for example, in the storage unit 52) in which information capable of identifying the image forming apparatus (serial number or the like) is associated with the apparatus information.

Step S22

The second image analysis unit 512 of the information processing apparatus 50 performs processing of detecting new image unevenness (unknown image unevenness). In this image unevenness detection processing, in particular, image unevenness that is difficult to determine from only an output image from one image forming apparatus 10 is detected with precision by referring to output images from the plurality of image forming apparatuses 10. It is desirable that the processing of step S22 be performed after inspection source data have been collected from a certain number of the image forming apparatuses 10. For example, the processing of step S22 (and step S23 performed sequentially) is performed every week, and the other processing is performed every time inspection source data and the like are transmitted (every day) from the image forming apparatus 10 in step S21.

Step S301

Referring to FIG. 9, the second image analysis unit 512 performs frequency analysis such as FFT analysis on the inspection source data acquired from the plurality of image forming apparatuses 10. The inspection source data is data based on read image data obtained by outputting the same inspection pattern, for example, halftone of each color of Y, M, C, and K from each image forming apparatus 10. The number of the image forming apparatuses 10 as the collection sources of the inspection source data can be appropriately selected, and may be about several tens to one hundred and several tens.

FIGS. 11A to 13C are examples of the frequency analysis processing performed on the profile data (detection source data).

Figure 11A:
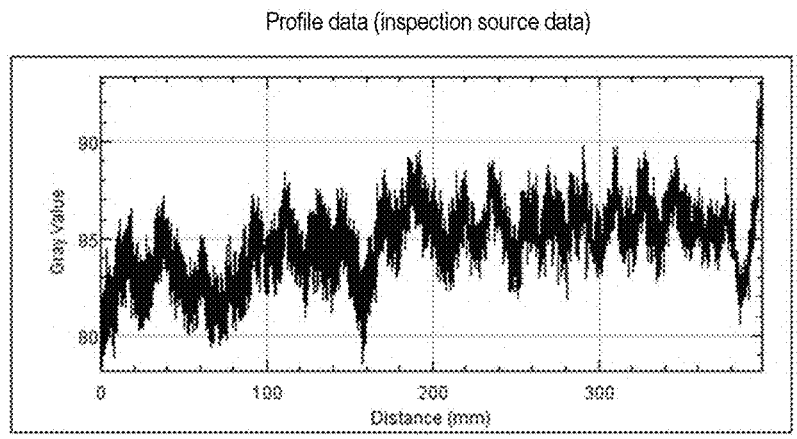
FIGS. 11A to 11C are diagrams illustrating an example of frequency analysis processing.
Figure 11B:
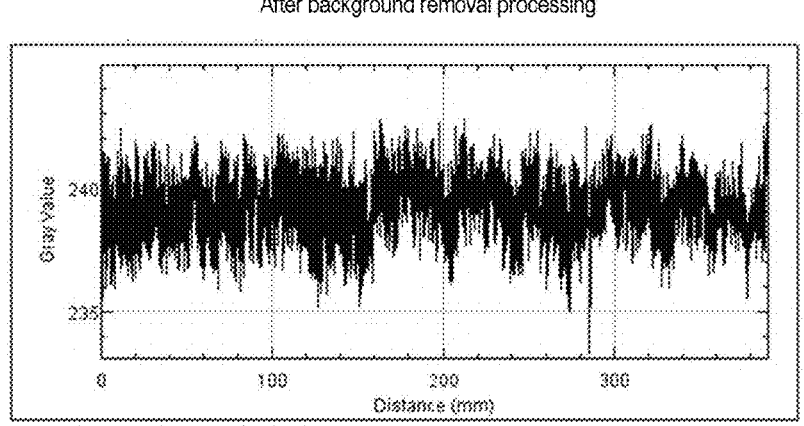
Figure 11C:
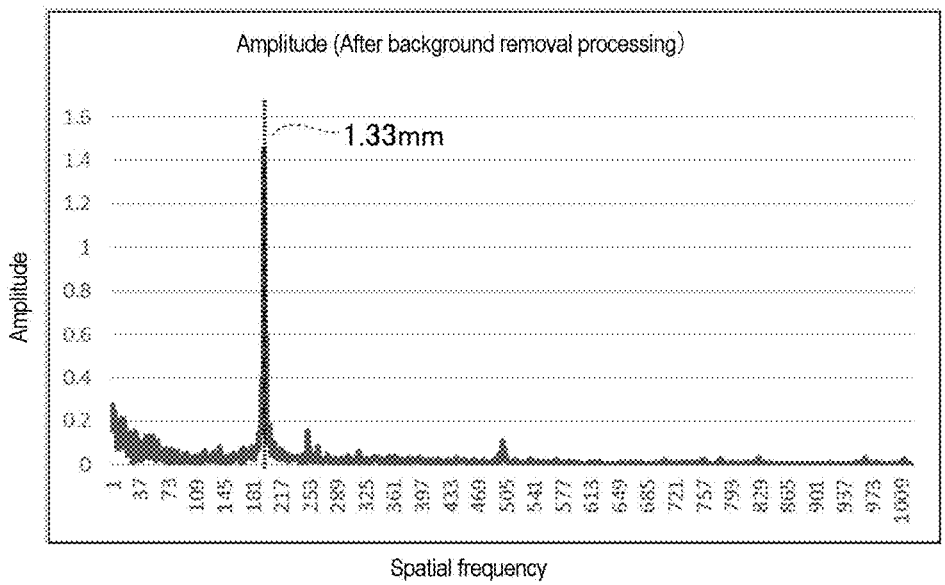
Figure 12A:
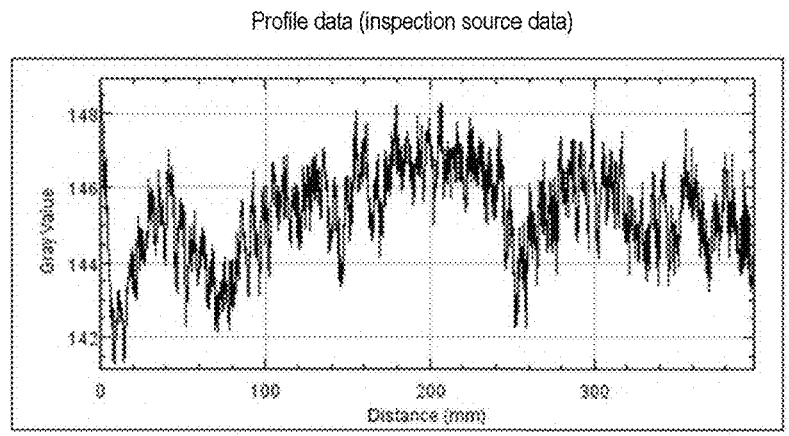
FIGS. 12A to 12C are diagrams illustrating an example of frequency analysis processing.
Figure 12B:
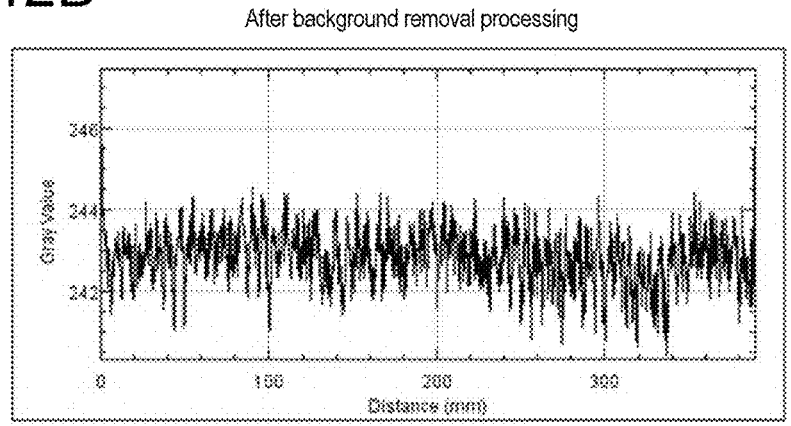
Figure 12C:
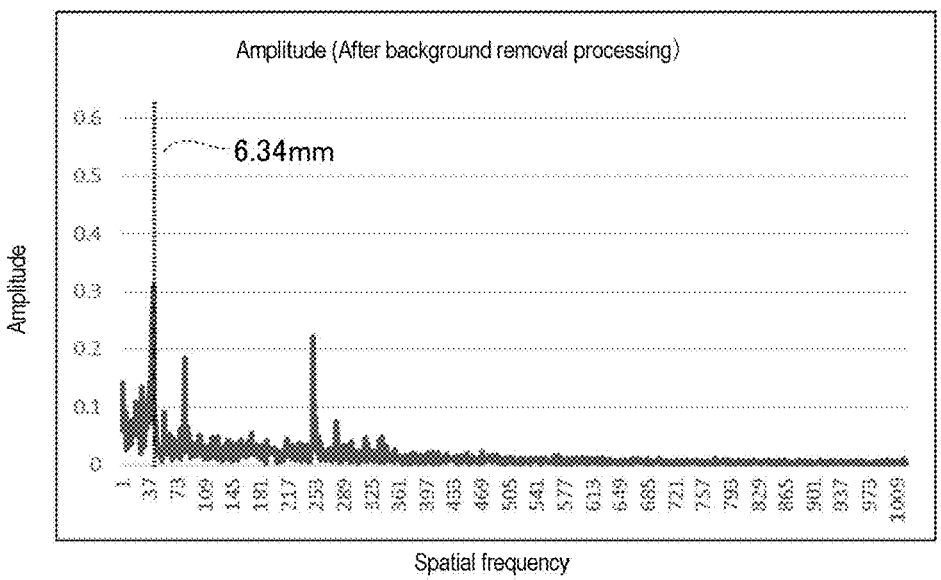
Figure 13A:
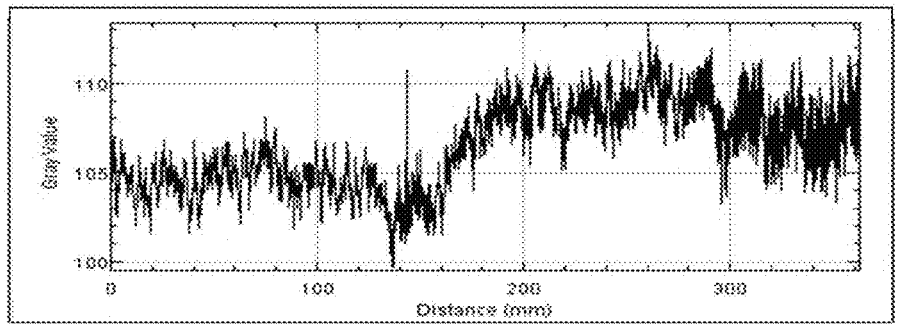
FIGS. 13A to 13C are diagrams illustrating an example of frequency analysis processing.
Figure 13B:
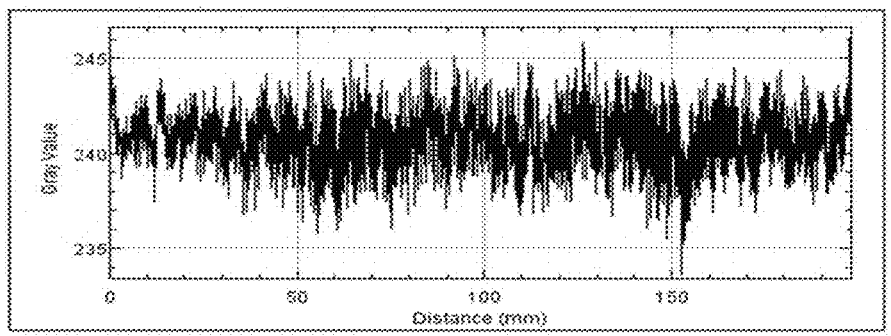
Figure 13C:
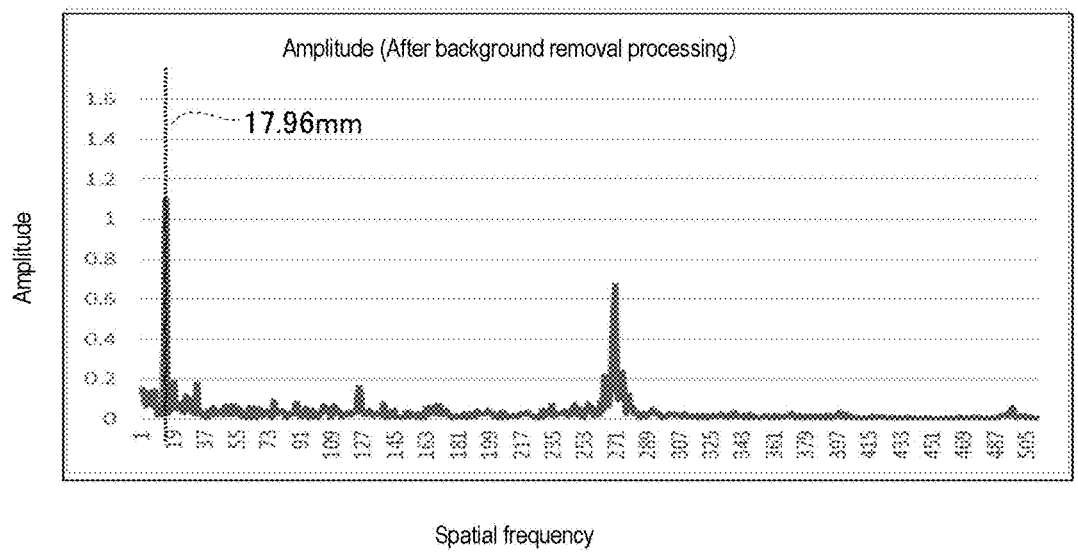

FIG. 11A illustrates profile data in a certain image forming apparatus 10. In the graph, the horizontal axis represents the position of an image corresponding to the entirety of one sheet 90, the left side is the leading end side, and the right side is the trailing end side. The vertical axis represents a luminance value (Gray value), and an upper side is bright and a lower side is dark (density is high). FIG. 11B is obtained by performing background removal processing, as preprocessing, on the profile data, and this processing removes the gradient of luminance from the leading end toward the trailing end that existed in FIG. 11A. FIG. 11C is a result of FFT analysis performed on the processed data of FIG. 11B. The horizontal axis represents spatial frequency (cycles/pixel) and the vertical axis represents amplitude (intensity). Similarly, FIGS. 12A to 13C are pieces of data obtained by processing profile data acquired from a certain image forming apparatus 10.

In the example of the FFT analysis result of FIG. 11C, it can be seen that there is a peak at the period 1.33 mm. As another example, it can be seen that in FIG. 12C, there is an amplitude peak at the period 6.34 mm, and in FIG. 13C, there is an amplitude peak at the period 17.96 mm.

Step S302

The second image analysis unit 512 extracts n frequencies having the highest amplitudes from the FFT analysis result obtained from each profile data. The n frequencies are several frequencies, and are, for example, five frequencies. In the example illustrated in FIG. 12C, frequencies with large amplitudes are extracted in order from the maximum peak 6.34 mm. However, at this time, a known period (cycle or frequency), that is, a period which is already a detection target in the first inspection items or the second inspection items is excluded. Five periods (hereinafter referred to as candidate periods) extracted from the frequency analysis result of the profile data of each image forming apparatus 10 and the amplitude values are saved in association with each other (hereinafter referred to as candidate data).

Step S303

The second image analysis unit 512 collects the candidate data of the plurality of image forming apparatuses 10 and analyzes the occurrence status for each candidate period.

Step S304

Then, candidate periods in which the occurrence rate is equal to or greater than a predetermined threshold value s1 or m candidate periods in which the image unevenness occurs in the most image forming apparatus 10 are determined as detection targets (new inspection period(s)).

Step S305

The second image analysis unit 512 performs frequency analysis, such as FFT analysis or wavelet analysis, on the profile data (or the pre-processed data) that is the inspection source data of each image forming apparatus 10 to acquire amplitude values of respective ones of one or a plurality of new detection periods (frequencies). The wavelet analysis takes more processing time than the FFT analysis, but the wavelet analysis has higher reliability when the frequency to be detected could have been identified.

Then, a determination threshold value is determined from the distribution of the amplitude values. The second image analysis unit 512 can determine the determination threshold value by statistical processing. A box-and-whisker plot or a normal distribution can be used as the statistical processing. For the box-and-whisker plot, the third quartile is set as the determination threshold value, and for the normal distribution, +2σ is set as the determination threshold value. Image unevenness equal to or greater than the determination threshold value is determined to be a defect. Thus, the processing of the subroutine in FIG. 9 ends, and the processing returns to the processing in FIG. 8.

Step S23

The second image analysis unit 512 sets (adds) one or a plurality of new inspection periods and a determination threshold value determined in steps S304 and S305 to the second inspection items as new inspection items. In consideration of the above-described viewpoint of the upper limit of the number of the first inspection items to be performed on the image forming apparatus 10 side, a new inspection item may be moved to the first inspection items according to the magnitude of incidence or the like.

Step S24

The second image analysis unit 512 performs, for the target image forming apparatus 10, inspection related to the second inspection items on the inspection source data (secondary inspection). As illustrated in FIG. 10, the second inspection items include, as inspection items different from the first inspection items, in particular, image unevenness (1.5 mm period), image unevenness (6 mm period), image unevenness (18 mm period), and the like that are periods other than the periods for which inspection is performed for the first inspection items (refer to FIG. 7). The second inspection items are set by the processing of the immediately preceding step S22 (particularly, S304-S305), or are set by the processing in step S22 before that (previously performed detection processing of FIG. 9).

Step S25

The output unit 515 generates a diagnostic report from the inspection result obtained by the above processing and causes the storage unit 52 to store the diagnostic report. The diagnostic report is output to the terminal device 70 by the web application function of the output unit 515 in response to a request from the terminal device 70 of the service staff. When viewing the diagnostic report, the service staff refers to the occurrence state and level of the image defect and the estimated cause, and uses those pieces of information for maintenance and management of the image forming apparatus 10.

Figure 14B:
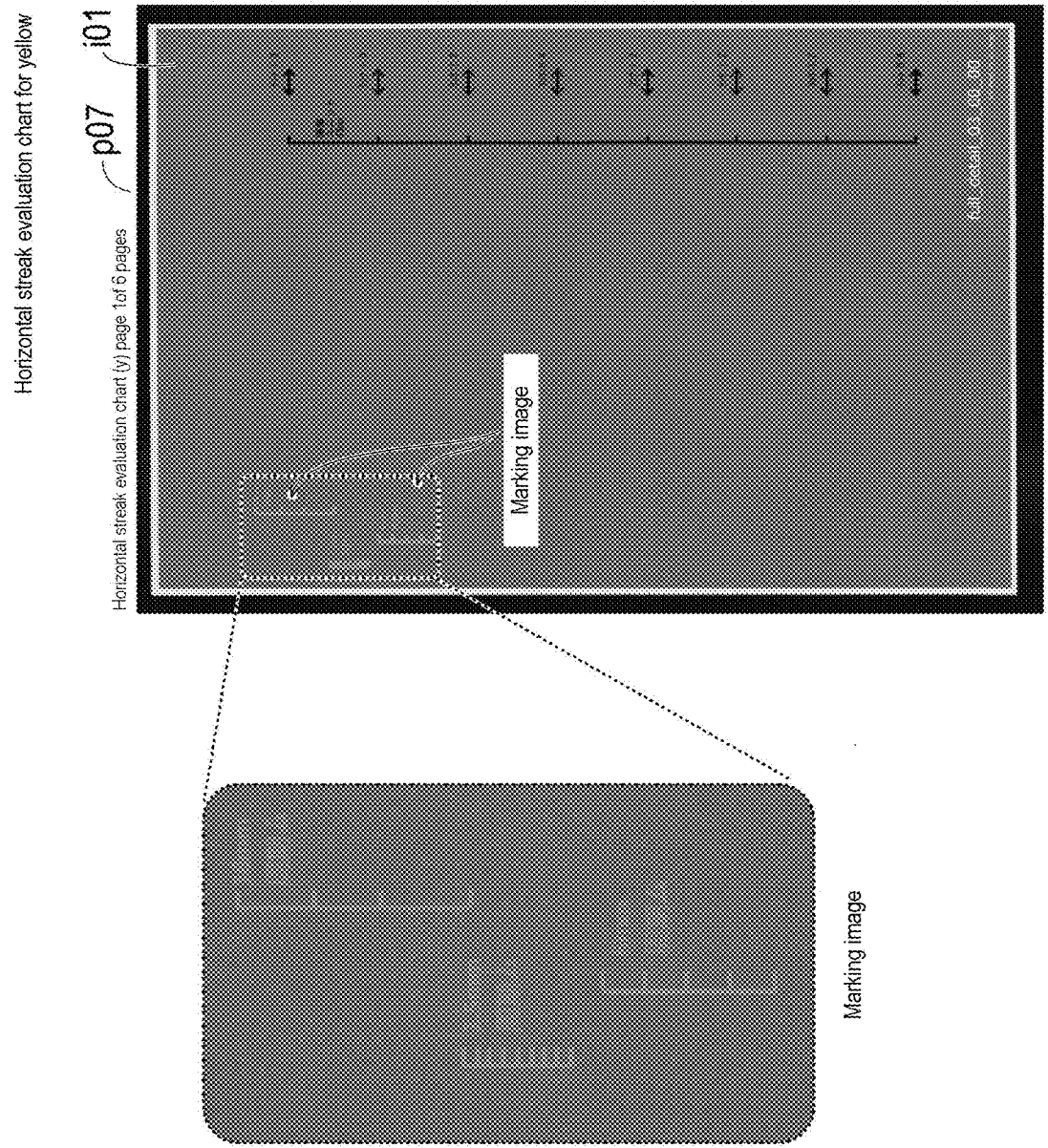
FIG. 14B is an example of a diagnostic report.

FIGS. 14A and 14B are examples of diagnostic reports. One diagnostic report is composed of a plurality of pages (about ten odd pages), and a part of the diagnostic report is illustrated in FIGS. 14A and 14B. FIG. 14A is the first page p01, and FIG. 14B is the seventh page that follows. In p07, read image data obtained by reading an output side of a Y color halftone inspection pattern (titled as "horizontal streak evaluation chart" in FIG. 14B) is illustrated; in the first page p01 and p02 (not illustrated) of the diagnostic report, information for identifying the image forming apparatus 10 (serial number) as a target and apparatus information such as model and use history are stated.

In the diagnostic report, the defects detected by the first image analysis unit 111 and the second image analysis unit 512 may be integrated, and a priority (importance) of each defect may be given. The inspection result (primary inspection result) of the first image analysis unit 111 is, for example, acquired together with other information from the image forming apparatus 10 in step S21. The diagnostic report may be displayed in a priority order. For example, the analysis result related to the first inspection items by the first image analysis unit 111 is displayed in the column all of the page p01 in FIG. 14A, and the analysis result related to the second inspection items by the second image analysis unit 512 is displayed in the column a12, and defects by both analysis units are integrated and displayed. Further, a priority (rank) may be given to each defect, or the defects may be arranged and displayed in the order of priority. In addition, the estimated cause of occurrence may be displayed together with the defect. The causes of occurrence are associated with the inspection items in advance as illustrated in FIGS. 7 and 10. As the cause of occurrence, the control unit 51 may automatically set a member that is driven to rotate with a rotation period corresponding to the period of image unevenness as the cause of occurrence, or a person in charge of the production company of the image forming apparatus 10 may set a member found by research and examination.

The pages p03 to p06 (neither illustrated) are lists of pieces of read image data for a plurality of pages that are transmitted from the image forming apparatus 10 (steps S14 and S21) and that are output sequentially. Among them, in the page p03, images obtained by reading sequential twelve sheets 90 on which a yellow halftone inspection pattern is printed by the Y development unit 133 are displayed as a thumbnail. The pages p04 to p06 are also a pages corresponding to the page p03 but of different colors and displays images in the magenta, cyan, and black colors as thumbnails, respectively.

The page p07 (FIG. 14B) and the pages p08 to p10 (neither illustrated) are an enlarged display of one image included in the pages p03 to p06. In a case where a defect is detected, a marking image indicating a portion where the defect occurs may be displayed. In the page p07 (FIG. 14B), a composite image is displayed in which a marking image indicating a portion where a defect has occurred is superimposed on an image i01 based on the inspection source. In the page p07, the type of defect (inspection items: image unevenness, periods: 18 mm, 1.5 mm, and 6 mm) is indicated beside the marking image (see the enlarged view in FIG. 14B). In particular, when the defect is image unevenness, the marking image is a ladder-like line chart corresponding to the periods of the image unevenness. Note that a rank may be displayed together with the type of defect. The degree of the defect is determined to be worse as the number of the rank is larger, and 1.0 or more is determined as NG (defect).

As described above, the information processing apparatus according to the first embodiment includes an acquisition unit that acquires inspection source data from an image forming apparatus, and a second image analysis unit that inspects the inspection source data for inspection content different from inspection performed by a first image analysis unit of the image forming apparatus. Accordingly, the load of arithmetic processing performed by the image forming apparatus can be reduced, and the image defect can be detected with high accuracy.

In particular, in the present embodiment, the second image analysis unit performs detection processing (FIG. 9) of detecting image unevenness of a new period other than the period for which the inspection is performed by the first image analysis unit, the image unevenness occurring commonly in a plurality of image forming apparatuses. With this configuration, image unevenness of a new period can be detected with high accuracy.

Second Embodiment

Figure 15:
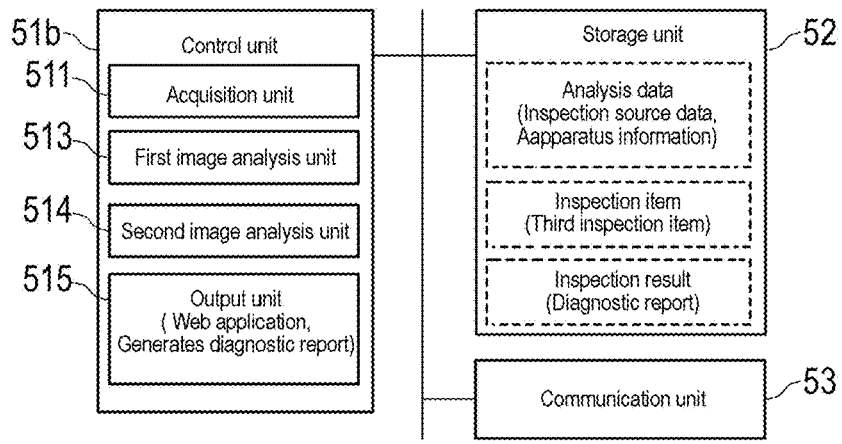
FIG. 15 is a block diagram illustrating a hardware configuration of an information processing apparatus according to a second embodiment.

While the image forming apparatus 10 side includes the first image analysis unit in the first embodiment, an information processing apparatus 50b side includes the first image analysis unit in a second embodiment described below. FIG. 15 is a block diagram illustrating a hardware configuration of the information processing apparatus 50b according to the second embodiment. Note that in the second embodiment, configurations other than the configuration illustrated in FIG. 15 are the same as those of the first embodiment including FIG. 1 and the like, and description thereof is omitted.

As illustrated in FIG. 15, the information processing apparatus 50b includes a control unit 51b, a storage unit 52, and a communication unit 53. The configurations of the storage unit 52 and the communication unit 53 are the same as those of the information processing apparatus 50 according to the first embodiment, and a description thereof will be omitted.

The control unit 51b functions as the acquisition unit 511, the first image analysis unit 513, the second image analysis unit 514, and the output unit 515. The acquisition unit 511 and the output unit 515 have the same functions as those of the corresponding configurations according to the first embodiment, and description thereof is omitted.

The first image analysis unit 513 has the same function as the first image analysis unit 111 (refer to FIG. 3) of the image forming apparatus 10 of the first embodiment. That is, the first image analysis unit 513 in the second embodiment detects an image defect related to predetermined third inspection items (group) in the inspection source data (read image data or profile data). The third inspection items include the first inspection items illustrated in FIG. 7. In addition, since there are almost no resource restrictions unlike the image forming apparatus 10, the third inspection items may further include, out of the second inspection items illustrated in FIG. 10, inspection items which have been known in the past image unevenness detection processing (step S22 or step S42 described below) may be included. The second image analysis unit 514 detects image unevenness of a new period other than the period for which the first image analysis unit 513 performs inspection based on known predetermined inspection items.

Inspection Processing Performed by Information Processing Apparatus 50

Figure 16:
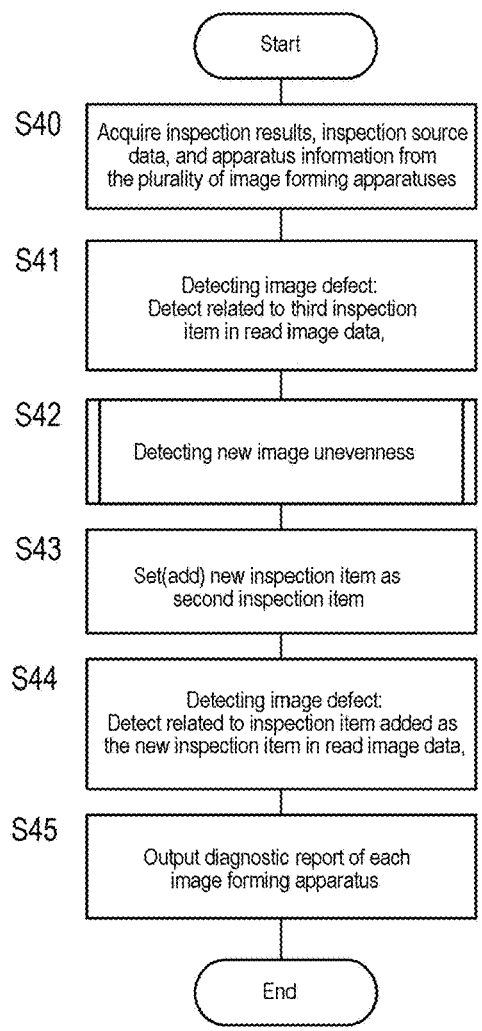
FIG. 16 is a flowchart illustrating inspection processing.

FIG. 16 is a flowchart illustrating an inspection processing performed by the information processing apparatus 50.

Step S40

Here, the acquisition unit 511 acquires inspection source data and apparatus information from each of the plurality of image forming apparatuses 10.

Step S41

The first image analysis unit 513 performs an inspection related to the predetermined third inspection items on the inspection source data acquired in step S40.

Step S42

The second image analysis unit 514 performs detection processing of new image unevenness (unknown image unevenness). The image unevenness detection processing in step S44 is also performed by the subroutine flowchart illustrated in FIG. 9 similarly to step S22.

Step S43

Similarly to step S23, the second image analysis unit 514 sets (adds) one or a plurality of new inspection frequencies and a determination threshold value determined in the processing of FIG. 9 as new inspection items to the third inspection items.

The second image analysis unit 514 performs, for the target image forming apparatus 10, inspection related to the third inspection items on the inspection source data. Note that since the processing duplicates with step S41, which has been performed, here, only the inspection related to the inspection items added as the new inspection items may be performed.

Step S45

Here, the same processing as that in step S25 is performed. That is, the output unit 515 generates a diagnostic report from the inspection result obtained by the above processing and causes the storage unit 130 to store the diagnostic report. The diagnostic report is output to the terminal device 70 by a web application function in response to a request from the terminal device 70 of the service staff.

As described above, the information processing apparatus according to the second embodiment includes an acquisition unit that acquires inspection source data from the image forming apparatus, and a second image analysis unit that performs the detection processing on the inspection source data to detect periodic image unevenness that has a new period other than a period inspected for a predetermined inspection item including an inspection item related to image unevenness having one or more specific periods and that commonly occurs in a plurality of pieces of the inspection source data acquired from the plurality of image forming apparatuses. With this configuration, image unevenness of a new period can be detected with high accuracy.

The configurations of the information processing apparatuses 50 and 50b, and the information processing system 500 including the same described above have been described as main configurations in describing the features of the above-described embodiments, are not limited to the above-described configurations, and can be modified in various forms within the scope of the claims. Furthermore, the configurations of the information processing apparatus 50 and 50b, and the information processing system 500 including the same are not excluded. For example, one or more embodiments of the present invention may be configured as modification examples described below.

First Modification Example

The apparatus information may be used for the detection processing (steps S22 and S42) performed by the second image analysis unit 512 (or 514) as in a modification example described below. The image forming apparatuses 10 to which the information processing apparatus 50 is connected may have different configurations naturally when the image forming apparatuses 10 are of different models, and the configurations may have small differences even when the image forming apparatuses 10 are of the same model. In addition, there may be cases where a defect such as image unevenness occurs only in apparatuses having a common configuration. For example, although a defect such as image unevenness related to a certain inspection item tends to occur in an initial lot, the defect may no longer occur in a next lot due to a minor change of the configuration itself or a secondary effect of the change. Furthermore, in a case where an adjustment value (setting condition) related to image formation and sheet conveyance is improperly adjusted, or is not properly adjusted due to incompatibility with the version of FW, the improper adjustment may be a cause of image unevenness.

Therefore, in the first modification example, in the new image unevenness detection processing, the image forming apparatuses 10 that are the same in at least a part of the apparatus information are grouped, and the image unevenness occurring in common in the group is detected. In this case, by grouping the image forming apparatuses 10 according to a plurality of pieces of apparatus information, one image forming apparatus 10 belongs to a plurality of groups. Specifically, the detection processing of FIG. 9 is performed a plurality of times for the respective groups each having common apparatus information, so that new image unevenness is detected. By doing so, it is possible to detect image unevenness occurring in the image forming apparatuses 10 having a certain specific apparatus information more accurately than in the first and second embodiments.

Second Modification Example

Figure 17:
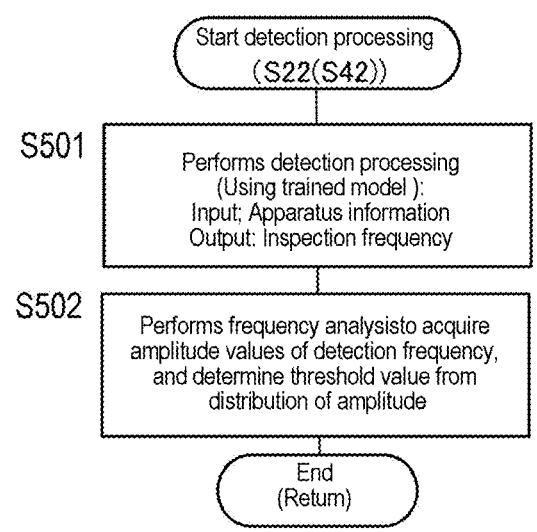
FIG. 17 is a subroutine flowchart illustrating detection processing of step S22 (or a S42) in a second modification example.

FIG. 17 is a subroutine flowchart illustrating the detection processing of step S22 (or step S42) in the second modification example. Although the new image unevenness detection processing is performed by the rule-based control processing in the first and second embodiments, the image unevenness detection processing may be performed by using a trained model by machine learning. This trained model can be trained by unsupervised training using a data set in which a large number of frequency analysis results (FIG. 11C, FIG. 12C, and the like) and pieces of apparatus information are associated as inputs. The trained model is stored in the storage unit 52. As an algorithm used in unsupervised training, a k-means method, a Ward method, principal component analysis, and the like can be applied. Using a trained model, an output of an inspection frequency is obtained by inputting apparatus information.

Step S501

Referring to FIG. 17, the second image analysis unit 512 (or 514) inputs apparatus information to the trained model stored in the storage unit 52 and obtains an output of an inspection frequency.

Step S502

The second image analysis unit 512 (or 514) performs frequency analysis on the profile data (or pre-processed data) by processing similar to that in step S305 to acquire amplitude values of one or a plurality of new detection frequencies. Then, a determination threshold value is determined from the distribution of the amplitude values. Thus, the processing of the subroutine of FIG. 17 ends, and the processing returns to the processing of FIG. 8 (or FIG. 16). Even when the machine trained model is used in this way, the same effects as those of the first or second embodiment can be obtained.

Other Modification Examples

In the second embodiment described above, the first image analysis unit 513 (FIG. 15) in the information processing apparatus 50b performs the inspection related to the third inspection items. The first image analysis unit 513 may be omitted, and all of the functions may be performed on the image forming apparatus 10 side. In the case where all the functions are performed on the image forming apparatus 10 side, the same functions as those of the first image analysis unit 513 are provided on the image forming apparatus 10 side. In this case, the information processing apparatus 50b (second image analysis unit 514) specializes only in the detection processing of a new inspection item (unknown frequencies of image unevenness), and distributes information (frequencies, a determination threshold value) of this inspection item to each image forming apparatus 10 after detecting the new inspection item. Then, the image forming apparatus 10 that has received the new inspection item adds the new inspection item to the first inspection items, and thereafter performs the regular inspection using this inspection item. As in the first modification example described above, if the inspection item relies on apparatus information, that is, a defect of an inspection item occurs only in some of the image forming apparatuses 10 having certain apparatus information, the inspection item may be distributed only to the image forming apparatus 10 having the apparatus information.

Means and methods for performing various types of processing in the information processing system 500 and the information processing apparatus 50 according to the above-described embodiments can be realized by any of a dedicated hardware circuit or a programmed computer. For example, the instructions may be provided by a computer-readable recording medium such as a universal serial bus (USB) memory or a digital versatile disc (DVD)-ROM, or may be provided online via a network such as the Internet. In this case, the instructions recorded on the computer-readable recording medium are usually transferred to and stored in a storage unit such as a hard disk. Further, the instructions may be provided as independent application software, or may be incorporated in software of the apparatus as one function of the apparatus.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus communicably connected to one or more image forming apparatuses each comprising: an image forming device that forms an image on a recording medium; an image reading device that reads the image to obtain read image data; and an image forming controller that executes a first inspection and detects in the read image data an image defect corresponding to a predetermined inspection item at a first cycle, the information processing apparatus comprising:
a processing controller that:
acquires inspection source data based on the read image data obtained from at least one of the image forming apparatuses, and
executes a second inspection to inspect the inspection source data.

2. The information processing apparatus according to claim 1, wherein
the predetermined inspection item includes image unevenness occurring at specific cycles, and
the processing controller inspects image unevenness occurring at a second cycle different from the first cycle.

3. The information processing apparatus according to claim 1, wherein the predetermined inspection item includes image unevenness occurring at specific cycles, and
the processing controller detects image unevenness occurring at a new cycle other than the first cycle.

4. The information processing apparatus according to claim 3, wherein
the processing controller detects the image unevenness that periodically occurs in common in a plurality of pieces of inspection source data based on read image data acquired from at least two of the image forming apparatuses.

5. The information processing apparatus according to claim 4, wherein
the processing controller acquires apparatus information indicating at least one of a model, a hardware version, a software version, a setting condition, a mounted component, and a use history of each of the image forming apparatuses, and
the processing controller detects the image unevenness periodically occurring in common in the inspection source data based on the read image data acquired from the at least two of the image forming apparatuses that have the same apparatus information at least in part.

6. The information processing apparatus according to claim 4, wherein the processing controller analyzes a frequency of the inspection source data, determines a threshold value of an amplitude or intensity of the frequency, and detects an image defect, based on a distribution of the amplitude or intensity of the image forming apparatuses, at a target cycle of the image unevenness occurring in common.

7. The information processing apparatus according to claim 1, wherein the processing controller integrates the image defect detected by the image forming controller and the image defect detected by the processing controller, and upon detecting a plurality of image defects, generates a report in which a priority is given to each of the image defects or the image defects are listed in an order corresponding to a priority order.

8. The information processing apparatus according to claim 1, wherein the processing controller integrates the image defect detected by the image forming controller and the image defect detected by the processing controller, and generates a report including a composite image in which a marking image indicating a portion where the image defect occurs is superimposed on an image generated based on the inspection source data.

9. An information processing system comprising:
an image forming apparatus that comprise: an image forming device that forms an image on a recording medium; an image reading device that reads the image to obtain read image data; and an image forming controller that detects in the read image data an image defect corresponding to a predetermined inspection item; and
the information processing apparatus according to claim 1.

10. An information processing apparatus communicably connected to a plurality of image forming apparatuses each comprising an image forming device that forms an image on a recording medium and an image reading device that reads the image to obtain read image data, the information processing apparatus comprising:
a processing controller that:
acquires inspection source data based on the read image data obtained from at least one of the image forming apparatuses, and detects in the inspection source data image unevenness periodically occurring at a new cycle other than specific cycles of a predetermined inspection item including image unevenness, the new cycle commonly occurring in a plurality of pieces of inspection source data based on read image data acquired from at least two of the image forming apparatuses.

11. The information processing apparatus according to claim 10, wherein
the image forming apparatus comprises:
an image forming controller that executes a first inspection and detects in the read image data an image defect corresponding to the predetermined inspection item and occurring at a first cycle, and
the processing controller detects the image unevenness occurring at the new cycle other than the first cycle.

12. The information processing apparatus according to claim 10, wherein
the processing controller executes a first inspection and detects in the inspection source data an image defect corresponding to the predetermined inspection item.

13. The information processing apparatus according to claim 10, wherein
the processing controller acquires apparatus information indicating at least one of a model, a hardware version, a software version, a setting condition, a mounted component, and a use history of each of the image forming apparatuses, and
the processing controller detects the image unevenness periodically occurring in common in the inspection source data based on the read image data acquired from the at least two of the image forming apparatuses that have the same apparatus information at least in part.

14. The information processing apparatus according to claim 10, wherein the processing controller analyzes a frequency of the inspection source data, determines a threshold value of an amplitude or intensity of the frequency, and detects an image defect, based on a distribution of the amplitude or intensity of the image forming apparatuses, at a target cycle of the image unevenness occurring in common.

15. The information processing apparatus according to claim 11, wherein the processing controller integrates the image defect detected by the image forming controller and the image defect detected by the processing controller, and upon detecting a plurality of image defects, generates a report in which a priority is given to each of the image defects or the image defects are listed in an order corresponding to a priority order.

16. The information processing apparatus according to claim 11, wherein the processing controller integrates the image defect detected by the image forming controller and the image defect detected by the processing controller, and generates a report including a composite image in which a marking image indicating a portion where the image defect occurs is superimposed on an image generated based on the inspection source data.

17. An information processing system comprising:
an image forming apparatus that comprises: an image forming device that forms an image on a recording medium; an image reading device that reads the image to obtain read image data; and an image forming controller that detects in the read image data an image defect corresponding to a predetermined inspection item; and
the information processing apparatus according to claim 10.

18. An image analysis method executed by an information processing apparatus communicably connected to one or more image forming apparatuses each comprising: an image forming device that forms an image on a recording medium; an image reading device that reads the image to obtain read image data; and an image forming controller that executes a first inspection and detects in the read image data an image defect corresponding to a predetermined inspection item at a first cycle, the image analysis method comprising:
acquiring inspection source data based on the read image data obtained from at least one of the image forming apparatuses; and
executing a second inspection to inspect the inspection source data.

19. The image analysis method according to claim 18, wherein
the predetermined inspection item includes image unevenness occurring at specific cycles, and
the executing the second inspection includes detecting image unevenness occurring at a second cycle different from the first cycle.

20. The image analysis method according to claim 18, wherein
the executing the second inspection includes detecting image unevenness occurring at a new cycle other than the first cycle.

21. The image analysis method according to claim 20, wherein the detecting includes detecting the image unevenness that periodically occurs in common in a plurality of pieces of inspection source data based on read image data acquired from at least two of the image forming apparatuses.

22. The image analysis method according to claim 21, wherein
the acquiring includes acquiring apparatus information indicating at least one of a model, a hardware version, a software version, setting conditions, mounted component, and a use history of each of the image forming apparatuses, and
the detecting includes detecting the image unevenness periodically occurring in common in the inspection source data based on the read image data acquired from the at least two of the image forming apparatuses that have the same apparatus information at least in part.

23. A computer-readable recording medium storing instructions that cause a computer to execute the image analysis method according to claim 18.

24. An image analysis method executed by an information processing apparatus communicably connected to a plurality of image forming apparatuses each comprising an image forming device that forms an image on a recording medium and an image reading device that reads the image to obtain read image data, the method comprising:
acquiring inspection source data based on the read image data obtained from at least one of the image forming apparatuses; and
detecting, on the inspection source data, image unevenness periodically occurring at a new cycle other than specific cycles of a predetermined inspection item including image unevenness, the new cycle commonly occurring in a plurality of pieces of the inspection source data based on read image data acquired from at least two of the image forming apparatuses.

25. The image analysis method according to claim 24, wherein
the acquiring includes acquiring apparatus information indicating at least one of a model, a hardware version, a software version, setting conditions, mounted component, and a use history of each of the image forming apparatuses, and the detecting includes detecting the image unevenness periodically occurring in common in the inspection source data based on the read image data acquired from the at least two of the image forming apparatuses that have the same apparatus information at least in part.

26. A computer-readable recording medium storing instructions that cause a computer to execute the image analysis method according to claim 25.

* * * * *